Figures 1, 2:
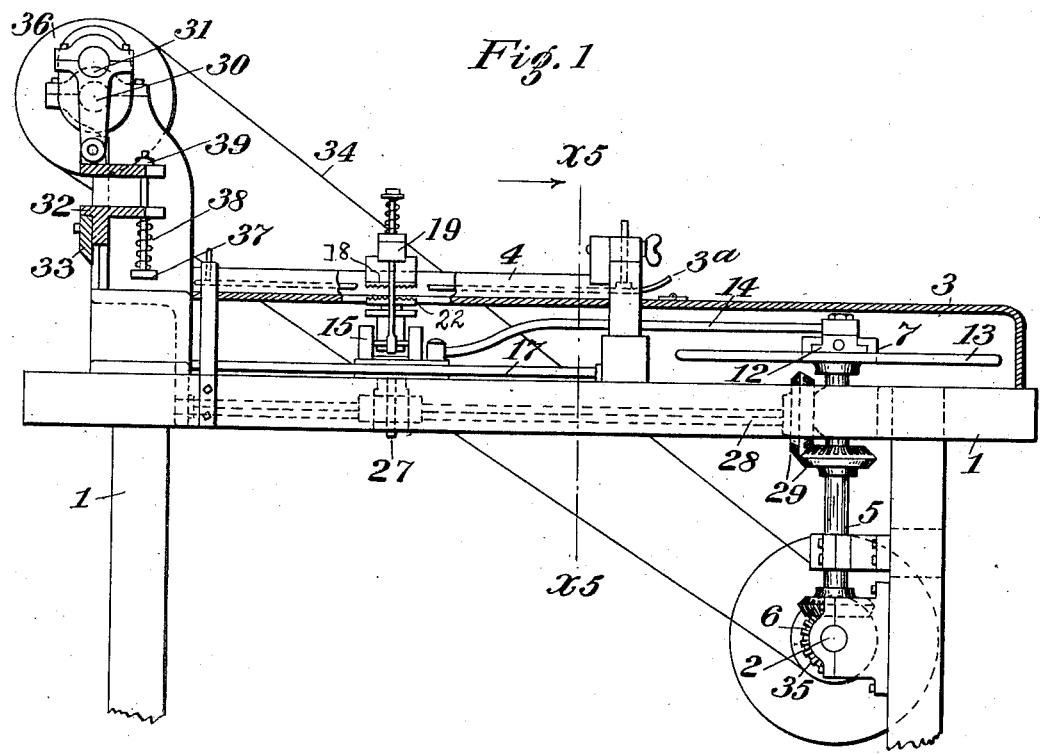

No. 703,183. Patented June 24, 1902.
W. G. CHAPIN.
MACHINE FOR FEEDING AND CUTTING SHEETS.
(Application filed Nov. 9, 1901.)
(No Model.) 2 Sheets—Sheet 1.

Witnesses
Bert C. Jones.
Charles W. Hildreth.

Inventor
William G. Chapin
By his Attorney
Henry Connett

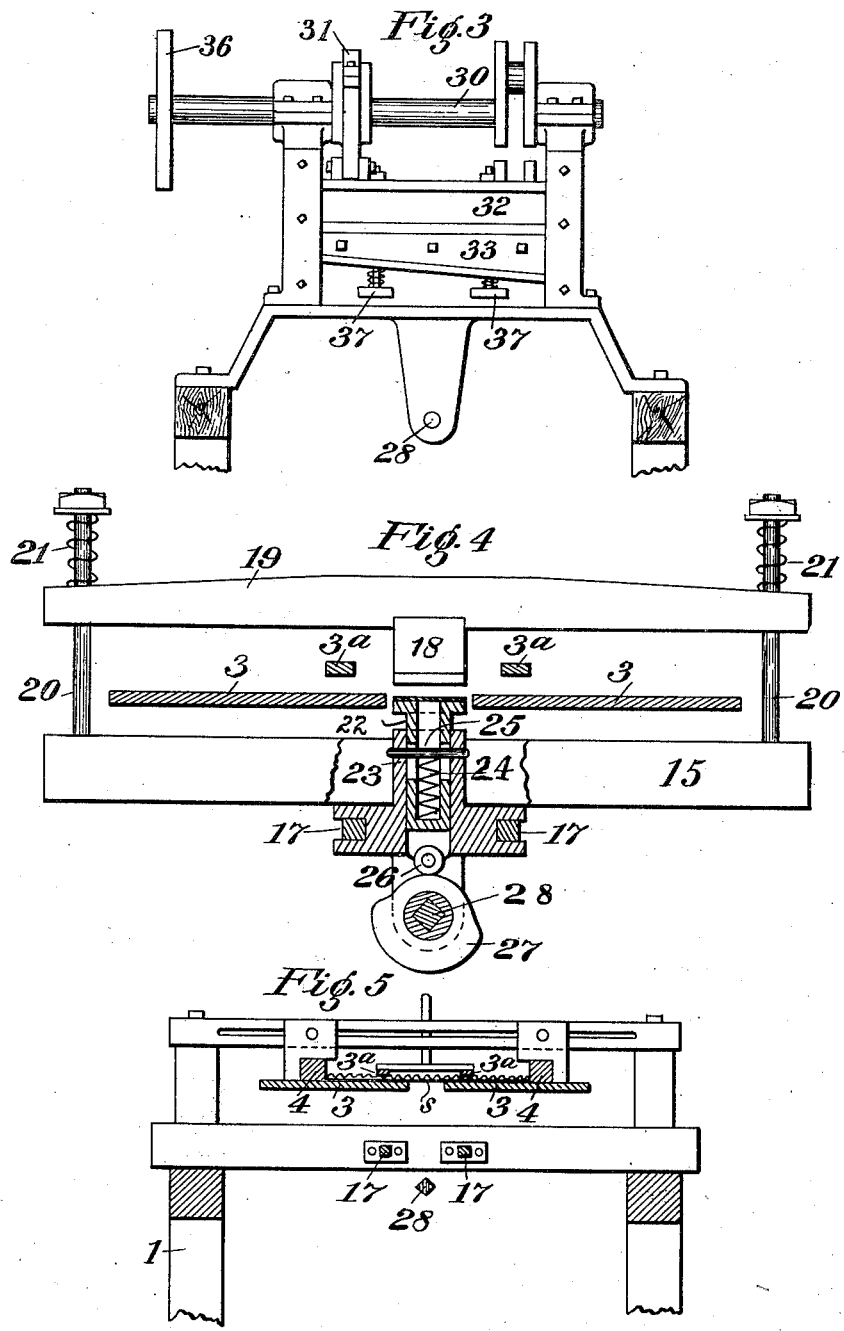

UNITED STATES PATENT OFFICE.

WILLIAM G. CHAPIN, OF BROOKLYN, NEW YORK, ASSIGNOR TO THE THOMPSON & NORRIS COMPANY, A CORPORATION OF NEW JERSEY.

MACHINE FOR FEEDING AND CUTTING SHEETS.

SPECIFICATION forming part of Letters Patent No. 703,183, dated June 24, 1902.

Application filed November 9, 1901. Serial No. 81,668. (No model.)

*To all whom it may concern:*

Be it known that I, WILLIAM G. CHAPIN, a citizen of the United States, residing in the city of New York, borough of Brooklyn, county of Kings, and State of New York, have invented certain new and useful Improvements in Machines for Feeding and Cutting Sheets, of which the following is a specification.

This invention relates to a machine for feeding in an intermittent manner paper or the like in sheet or strip form and cutting the same into uniform lengths; and the purpose of the invention is to provide a simple and effective automatic machine which may be made to operate very accurately.

In the accompanying drawings, which serve to illustrate an embodiment of the invention, Figure 1 is a sectional side elevation of the machine. Fig. 2 is a plan of the same. Fig. 3 is an end elevation showing the cutter. Fig. 4 is a transverse section, on a larger scale, showing the gripper of the feed, showing the gripping mechanism in section. Fig. 5 is a transverse section at $x^5$ in Fig. 1.

1 is the supporting-frame of the machine, and 2 is the transverse main driving-shaft from which the feeding and cutting mechanism is operated.

3 is the bed or surface on which the sheet to be fed and cut is supported, and $3^a$ represents bearers or guides over the sheet to keep it down.

4 represents the adjustable side guides.

The feeder for the sheet consists of a reciprocating carriage, means for operating said carriage, a gripper on the carriage for seizing the sheet and feeding it forward, and means for opening and closing the gripper-jaws. On an upright shaft 5, driven through the main shaft 2 by means of bevel-gears 6, is mounted a crank 7. This crank has a guideway 8 in its upper face, in which is slidably mounted a wrist-block 9, carrying the crank-wrist 10. This block is threaded on a screw 11, which extends along the guideway and is collared at 12, so that it cannot move longitudinally. By means of this screw 11 the crank-wrist may be adjusted radially to the circle in which it travels, so as to accurately regulate the throw of the crank. To strengthen the crank and provide a convenient means of turning it by hand when desired, it has a circular rim 13. The wrist of this crank is coupled by a connecting-rod 14 to the carriage 15 of the feed mechanism at 16. This carriage is slidably mounted on fixed guides 17, extending lengthwise of the machine-frame. Thus rotation of the crank imparts a reciprocating movement to the carriage, the extent of movement being limited by the throw of the crank. On the carriage 15 are mounted the gripper-jaws. The upper fixed jaw 18, Fig. 4, is secured to a transverse bar 19, which is slidable up and down on upright rods 20 on the carriage and is backed by cushion-springs 21, which allow it to yield slightly to pressure from below exerted by the movable jaw 22. This movable jaw plays vertically in an outer casing or guide 23, fixed in the carriage and is hollow. In the hollow of the jaw 22 is a spring 24, which bears below on the bottom of the hollow in the jaw and above against a cross-bar 25, fixed at its ends in the walls of said guide and extending through slots in the walls of the jaw. At its lower end the jaw 22 has a roller 26, which bears on a cam 27. This cam is rotatably mounted in the carriage 15 and slidably mounted loosely on a square spline-shaft 28, rotatively mounted in the machine-frame and extending lengthwise of the machine. This shaft is driven from the upright shaft 5 by means of bevel-gears 29. The cam 27 is so formed and so set with reference to the crank 7 that it closes the lower gripper-jaw on the sheet at the proper moment for advancing the latter, holds it closed while the crank is advancing the sheet, and permits the spring 24 to retract the jaw and release the sheet at the moment the crank has ceased advancing the sheet and is ready to withdraw. The object of this intermittent feed is to feed the sheet to a cutter for cutting it off in uniform lengths. This cutter is best illustrated at the left in Fig. 1, where it is seen partly in section, and in Fig. 3, where it is seen in front elevation.

In a crank-shaft 30, rotatively mounted in an elevated part of the frame, are cranks, the pins of which are coupled by connecting-rods 31 with a knife-gate 32, movable up and down in guides in said frame. This gate carries a knife 33. The shaft 30 is driven from the main shaft 2 by a link belt 34 and sprocket-wheels 35 and 36 on the respective shafts 2 and 30.

In order to press down the sheet firmly adjacent to the knife 33 at the time of cutting, a device is employed which is best seen in Fig. 1. Two presser-feet 37, having their upright stems guided in the knife-gate back of the knife, have on said stems cushion-springs 38, embraced between the gate and the feet below, and each stem has on its upper end a nut 39, which serves as an adjustable stop to limit the extent of movement downward of the foot under the influence of the spring. When the knife-gate descends, these presser-feet find a bearing on the sheet before the knife comes into play, and the springs 38 yield to the further downward movement of the gate.

The side guides 4 (best illustrated in Fig. 5) serve to prevent lateral movement or shifting of the sheet as it is fed to the cutter, and their adjustability permits of their adaptation to sheets of different widths within limits.

In Fig. 2 the supporting-bed 3 is mainly broken away in order to show the feeding mechanism below it. The cam 27 is collared in and has bearings in pendent portions of the carriage 15, so that it moves to and fro with the latter on the square spline-shaft 28 and is driven or rotated thereby, but has no bearing thereon. The only object in making the shaft 28 square is to compel the slidable cam to rotate with it, and an obvious equivalent would be an ordinary spline or rib on the shaft to engage a keyway in the cam. Such a spline mechanism is too well known to require illustration.

Having thus described my invention, I claim—

1. In a machine of the character described, the means for feeding the sheet material intermittently, said means comprising a reciprocating carriage, a gripper device thereon for seizing the material, a cam rotatively mounted in said carriage and adapted to operate said gripper, and a rotating spline-shaft parallel with the path of the gripper-carriage and extending through said cam, whereby the latter is rotated during the movement of the carriage.

2. In a machine of the character described, the means for feeding the sheet material intermittently, said means comprising a horizontally-rotating crank, a gripper-carriage slidably mounted on guides, the said guides, a rod connecting said crank and carriage, a fixed gripper-jaw on said carriage, the movable gripper-jaw on said carriage, the retracting-spring of said jaws, a cam 27 mounted rotatively in said carriage and adapted to operate said movable jaw, a spline-shaft 28, rotatively mounted parallel with the guides of the carriage, said shaft extending through a square aperture in the cam, and means for driving said shaft.

3. In a machine for feeding sheets intermittently, and cutting off the same, the combination with a main driving-shaft, a reciprocating knife driven from said shaft, and means for feeding the sheet to the knife, said means comprising an upright crank-shaft driven from the main shaft, a crank on the upright shaft, a gripper-carriage, a rod coupling the wrist of the crank with said carriage, a sheet-gripper on said carriage, a cam rotatively mounted in the carriage for operating the gripper, and a spline-shaft driven from the main shaft and driving in turn the said cam.

4. In a machine for the purpose specified, the feeding device, comprising the carriage, the tracks or guideways therefor, the upper jaw of the gripper mounted on said carriage and provided with cushion-springs, the lower jaw of the gripper mounted movably, its guide and spring, the cam for operating said lower jaw, said cam being mounted rotatively in said carriage, means for reciprocating said carriage and means for rotating said cam during the movement of the carriage.

5. In a machine for the purpose specified, the gripper device comprising the carriage 15, having upright guide-rods 20, the bar 19 mounted on said rods, the cushion-springs behind said bar, the upper gripper-jaw 18 mounted on said bar, the guide 23 of the lower gripper-jaw 22, the said jaw, the spring for depressing said jaw in its guide, and the cam 27, mounted rotatively in the carriage under said lower jaw and bearing thereon.

In witness whereof I have hereunto signed my name, this 19th day of October, 1901, in the presence of two subscribing witnesses.

WILLIAM G. CHAPIN.

Witnesses:
GEORGE J. RIEGLER,
EDW. H. KELSEY.